(12) United States Patent
Yang et al.

(10) Patent No.: US 10,715,822 B2
(45) Date of Patent: Jul. 14, 2020

(54) IMAGE ENCODING METHOD AND ENCODER

(71) Applicant: SZ DJI TECHNOLOGY CO., LTD., Shenzhen (CN)

(72) Inventors: Xiaohu Yang, Shenzhen (CN); Liangping Zhang, Shenzhen (CN); Zhongqian You, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/594,788

(22) Filed: Oct. 7, 2019

(65) Prior Publication Data

US 2020/0045324 A1 Feb. 6, 2020

Related U.S. Application Data

(63) Continuation of application No. 15/720,627, filed on Sep. 29, 2017, now Pat. No. 10,469,855, which is a
(Continued)

(51) Int. Cl.
*H04N 19/20* (2014.01)
*H04N 19/177* (2014.01)
(Continued)

(52) U.S. Cl.
CPC .......... *H04N 19/20* (2014.11); *H04N 19/107* (2014.11); *H04N 19/124* (2014.11);
(Continued)

(58) Field of Classification Search
None
See application file for complete search history.

(56) References Cited

U.S. PATENT DOCUMENTS

| | | | | |
|---|---|---|---|---|
| 6,816,552 B2 * | 11/2004 | Demos | .................. | H04N 19/51 348/409.1 |
| 8,023,562 B2 * | 9/2011 | Zheludkov | ............. | H04N 19/56 375/240.12 |

(Continued)

FOREIGN PATENT DOCUMENTS

| | | |
|---|---|---|
| CN | 101232619 A | 7/2008 |
| CN | 101321284 A | 12/2008 |

(Continued)

OTHER PUBLICATIONS

Ali, Ismail, et al. "Content dependent intra-refresh placement for video streaming" 2011 3rd Computer Science and Electronic Engineering Conference (CEEC). IEEE, 2011. (Year: 2011).*

(Continued)

*Primary Examiner* — Andrae S Allison
(74) *Attorney, Agent, or Firm* — Anova Law Group, PLLC (57) ABSTRACT

An image encoding method includes: determining N P-frames from a sequence of images, N being a positive integer; for each P-frame, determining a source refreshing region in the P-frames, the source refreshing region being a portion less than a whole region of the P-frame; obtaining reconstructed images corresponding to the source refreshing regions by performing a first encoding on the source refreshing regions; obtaining updated P-frames by updating the source refreshing regions with the reconstructed images; and performing a second encoding on the updated P-frames.

15 Claims, 3 Drawing Sheets

Related U.S. Application Data continuation of application No. PCT/CN2015/075485, filed on Mar. 31, 2015.

(51) Int. Cl.

| | | |
|---|---|---|
| *H04N 19/507* | (2014.01) | |
| *H04N 19/194* | (2014.01) | |
| *H04N 19/159* | (2014.01) | |
| *H04N 19/146* | (2014.01) | |
| *H04N 19/174* | (2014.01) | |
| *H04N 19/107* | (2014.01) | |
| *H04N 19/124* | (2014.01) | |
| *H04N 19/40* | (2014.01) | |

(52) U.S. Cl.
CPC ......... *H04N 19/146* (2014.11); *H04N 19/159* (2014.11); *H04N 19/174* (2014.11); *H04N 19/177* (2014.11); *H04N 19/194* (2014.11); *H04N 19/40* (2014.11); *H04N 19/507* (2014.11)

(56) References Cited

U.S. PATENT DOCUMENTS

| | | | | |
|---|---|---|---|---|
| 2001/0026677 A1* | 10/2001 | Chen | ............... | H04N 21/23424 386/345 |
| 2002/0126130 A1* | 9/2002 | Yourlo | ............... | G06F 3/14 345/582 |
| 2003/0138043 A1* | 7/2003 | Hannuksela | ............. | H04N 19/46 375/240.08 |
| 2005/0207576 A1* | 9/2005 | Rijckaert | ............. | H04K 1/00 380/210 |
| 2006/0078051 A1* | 4/2006 | Liang | ............... | H04N 19/176 375/240.24 |
| 2011/0090961 A1* | 4/2011 | Fong | ............... | H04N 19/159 375/240.15 |
| 2012/0236199 A1* | 9/2012 | Imai | ............... | H04N 19/507 348/415.1 |
| 2015/0229960 A1* | 8/2015 | Yamasaki | ............. | H04N 19/593 375/240.12 |

FOREIGN PATENT DOCUMENTS

| | | |
|---|---|---|
| CN | 103796019 A | 5/2014 |
| CN | 103873869 A | 6/2014 |
| JP | 5016561 B2 | 9/2012 |
| KR | 20060081970 A | 7/2006 |

OTHER PUBLICATIONS

Lawan, Sagir. Adaptive intra refresh for robust wireless multi-view video. Diss. Brunel University London, 2016. (Year: 2016).*

Sagir, L., and Abdul H. Sadka. "Robust Adaptive Intra Refresh for Multiview Video." (2014). (Year: 2014).*

H. Chen, C. Zhao, M. Sun and A. Drake, "Adaptive intra-refresh for low-delay error-resilient video coding," Signal and Information Processing Association Annual Summit and Conference (APSIPA), 2014 Asia-Pacific, Siem Reap, 2014, pp. 1-4. (Year: 2014).

Q. Wang, R. Hu and Z. Wang, "Intracoding and Refresh With Compression-Oriented Video Epitomic Priors," in IEEE Transactions on Circuits and Systems for Video Technology, vol. 22, No. 5, pp. 714-726, May 2012. (Year: 2012).

The World Intellectual Property Organization (WIPO) International Search Report for PCT/CN2015/075485 dated Dec. 31, 2015 6 Pages.

* cited by examiner

IMAGE ENCODING METHOD AND ENCODER

CROSS-REFERENCE TO RELATED APPLICATION

This application is a continuation application of U.S. patent application Ser. No. 15/720,627, filed on Sep. 29, 2017, which claims priority of International Application No. PCT/CN2015/075485, filed on Mar. 31, 2015. The entire contents of above applications are incorporated herein by reference.

TECHNICAL FIELD

The present disclosure relates to image processing, and more particularly to an image encoding method and an encoder.

BACKGROUND OF THE DISCLOSURE

In the field of video decoding, I-frames are used to refresh invalid videos or images during low-delay transmission of videos or images. The refreshing can often cause periodic fluctuation in image quality, a phenomenon called "breathing effect". In order to reduce the breathing effect, an I-frame block can be dispersed into a plurality of P-frames in form of slices, and then each sub-I-frame in those P-frames can be successively refreshed from top to bottom or from left to right until the I-frame is completely refreshed. Each one of the image frames can be made smooth in size and suitable for real-time transmission by successively refreshing multiple image frames. However, a "rolling strip" phenomenon may appear. The rolling strip phenomenon can be suppressed with the following two approaches.

In the first approach, refreshing blocks can be dispersed in the image frame, such that the rolling strip phenomenon can be less obvious to some extent. However, it is difficult to protect a "refreshed region" with this approach. For instance, a region being previously refreshed can later refer to a "dirty region" (e.g., a region not being refreshed), such that the refreshed region may become dirty again after a few frames. As a result, the image can only be cleaned with repeated refreshing, leading to low refreshing efficiency.

In the second approach, an image can be divided into several refreshing regions, and the order of refreshing can be adjusted according to a global my. With this approach, a rapid spreading of errors from a "dirty region" to the refreshing regions can be prevented to some extent, and thus a refresh efficiency can theoretically be better than that of the first approach. However, flicker can still be apparent since this approach fails to solve the problem of low efficiency of I-blocks.

The two approaches as discussed hereinabove are unable to solve the problem of low compression efficiency of I-frames or I-blocks. The "breathing effect" of images can be apparent even if the images are refreshed by inserting an I-frame or dispersing an I-block into P-frames, leading to poor user experience.

SUMMARY OF THE DISCLOSURE

The present disclosure provides an image encoding method and an encoder capable of solving the problem of breathing effect that occurs in low-delay video transmission at a fixed bandwidth.

A first aspect of the disclosure provides an image encoding method, the method comprising: determining N P-frames from a sequence of images, and determining a source refreshing region from each one of the P-frames; obtaining reconstructed images corresponding to the source refreshing regions by performing a first encoding on the source refreshing regions, N being a positive integer; obtaining updated P-frames by updating the source refreshing regions with the reconstructed images; and performing a second encoding on the updated P-frames.

In some embodiments, the updated P-frame can comprise a new refreshing region and a source region separate from the new refreshing region, the new refreshing region corresponding to the reconstructed image; and performing the second encoding on the updated P-frames can comprise: performing the second encoding on the new refreshing region according to a whole I-block; performing the second encoding on the source region according to an encoding mode of the P-frame.

In some embodiments, in performing the first encoding, the first encoding can be performed on an image data in the source refreshing region based upon the P-frame.

In some embodiments, performing the second encoding on the source region according to the P-frame can comprise: if the source region comprises an unrefreshed region, then performing the second encoding on the unrefreshed region according to the P-frame; if the source region comprises a refreshed region, then performing the second encoding on the refreshed region according to the P-frame; or, if the source region comprises an unrefreshed region and a refreshed region, then performing the second encoding on the unrefreshed region and the refreshed region respectively according to the P-frame.

In some embodiments, the N P-frames can be consecutive N P-frames, and the first encoding and the second encoding can be performed on each one of the P-frames in an order of P1, P2, . . . , PN from left to right; obtaining the reconstructed images corresponding to the source refreshing regions by performing the first encoding on the source refreshing regions of the P-frames can comprise: when the first encoding is performed on the source refreshing region of each one of the P-frames, obtaining a reconstructed image corresponding to the P-frame by referring to a new refreshing region on which the second encoding has been performed in a previous P-frame; and obtaining the updated P-frames by updating the source refreshing regions with the reconstructed images can comprise: on basis of each one of a plurality of macro blocks included in the reconstructed image, assigning values to parameter values corresponding to each macro block in the source refreshing region by taking parameter values corresponding to the reconstructed image as reference, so as to update the source refreshing region with the reconstructed image and to obtain a new refreshing region, thereby forming an updated P-frame.

In some embodiments, the method can further comprise: performing the first encoding and the second encoding successively on each one of the P-frames.

In some embodiments, each one of the P-frames can comprise N regions. Except for the first encoded P-frame, an $(N-m)^{th}$ region of a $m^{th}$ P-frame can be identical to an $(N-m)^{th}$ region of a $(m-1)^{th}$ P-frame. A new refreshing region of the $m^{th}$ region can be obtained by referring to new refreshing regions of a $1^{st}$ part to an $(N-2)^{th}$ part of the $(m-1)^{th}$ P-frame, wherein $2 \leq m \leq N$.

In some embodiments, each one of the P-frames can comprise a plurality of macro blocks, and performing the first encoding and the second encoding successively on each one of the P-frames can comprise: on basis of the macro blocks, successively refreshing the N P-frames in a row of macro blocks from top to bottom or in a column of macro blocks from left to right according to the encoding order until the refreshing of the I-frame is completed, wherein when each one of the P-frames is refreshed, a P-frame immediately preceding the P-frame and a P-frame immediately following the P-frame can overlap at a boundary thereof or do not overlap with each other.

In some embodiments, performing the first encoding on the source refreshing regions of the P-frames according to the P-frame can comprise: performing the first encoding on each source refreshing region using a quantization parameter QP according to the P-frame, and recording the QP using a first quantization FirstQ, wherein the QP is adjusted according to a bit rate required in transmitting the P-frame.

A second aspect of the disclosure provides an encoder, the encoder comprising: a processing unit configured to determine N P-frames from a sequence of images, and determine a source refreshing region from each one of the P-frames; and an encoding unit configured to obtain reconstructed images corresponding to the source refreshing regions by performing a first encoding on the source refreshing regions, wherein N is a positive integer.

The processing unit can be further configured to obtain updated P-frames by updating the source refreshing regions with the reconstructed images.

The encoding unit can be further configured to perform a second encoding on the updated P-frames.

In some embodiments, each of the updated P-frame can comprise a new refreshing region and a source region separate from the new refreshing region, the new refreshing region corresponding to the reconstructed image.

The encoding unit can be configured to: perform the second encoding on the new refreshing regions according to an I-frame; and perform the second encoding on the source regions according to the P-frame.

In some embodiments, the encoding unit can be configured to: if the source region comprises an unrefreshed region, then perform the second encoding on the unrefreshed region according to the P-frame; if the source region comprises a refreshed region, then perform the second encoding on the refreshed region according to the P-frame; or if the source region comprises an unrefreshed region and a refreshed region, then perform the second encoding respectively on the unrefreshed region and the refreshed region according to the P-frame.

In some embodiments, the N P-frames can be consecutive N P-frames, and the first encoding and the second encoding can be performed on each one of the P-frames in an encoding order of P1, P2, ..., PN from left to right.

The encoding unit can be further configured to: when the first encoding is performed on the source refreshing region of each one of the P-frames, obtain a reconstructed image corresponding to the P-frame by referring to a new refreshing region on which the second encoding has been performed in a previous P-frame.

The processing unit can be further configured to: on basis of each one of a plurality of macro blocks included in the reconstructed image, assign values to parameter values corresponding to each macro block in the source refreshing region by taking parameter values corresponding to the reconstructed image as reference, so as to update the source refreshing region with the reconstructed image and to obtain a new refreshing region, thereby forming an updated P-frame.

In some embodiments, the encoding unit can be further configured to: perform the first encoding and the second encoding successively on each one of the P-frames.

In some embodiments, each one of the P-frames can comprise N regions. Except for the first encoded P-frame, an $(N-m)^{th}$ region of a $m^{th}$ P-frame can be identical to an $(N-m)^{th}$ region of a $(m-1)^{th}$ P-frame. A new refreshing region of the $m^{th}$ region can be obtained by referring to new refreshing regions of a $1^{st}$ part to an $(N-2)^{th}$ part of the $(m-1)^{th}$ P-frame, and wherein $2 \leq m \leq N$.

In some embodiments, each one of the P-frames can comprise a plurality of macro blocks, and the encoding unit can be further configured to: on basis of the macro blocks, successively refresh the N P-frames in a row of macro blocks from top to bottom or in a column of macro blocks from left to right according to the encoding order until the refreshing of the I-frame is completed, wherein when each one of the P-frames is refreshed, a P-frame immediately preceding the P-frame and a P-frame immediately following the P-frame can overlap at a boundary thereof or do not overlap with each other.

In some embodiments, the encoding unit can be further configured to: perform the first encoding on each source refreshing region using a quantization parameter QP according to the P-frame, and record the QP using a first quantization FirstQ, wherein the QP can be adjusted according to a bit rate required for transmitting the P-frame.

It can be appreciated from technical solutions of the disclosure that, after the I frames are dispersed into N P-frames, the reconstructed images can be obtained by performing a first encoding on the source refreshing regions of the P-frames. Then, updated P-frames can be obtained by updating the source refreshing region with the reconstructed images, and a second encoding can be performed on the updated P-frames. By performing encoding on each P-frame twice, a compression efficiency and a bit rate stability can be effectively improved.

DETAILED DESCRIPTION OF THE EMBODIMENTS

A better understanding of the disclosure will be obtained by reference to the following detailed description that sets forth illustrative embodiments with reference to the drawings. It will be apparent that, the embodiments described herein are merely provided by way of example only. Those skilled in the art can conceive various embodiments in light of those embodiments disclosed herein without inventive efforts, and all these embodiments are within the scope of the disclosure.

As used in the description, claims and drawings of the disclosure, the terms "first", "second" and the like are used to distinguish similar objects, rather than indicating a specific order or sequence. It will be appreciated that, data described in this manner can be interchangeable in appropriate situations, such that embodiments thus described can be implemented in orders other than those illustrated or described herein. In addition, the terms "include", "comprise", "have" and any variations thereof are intended to encompass non-exclusive inclusion. For example, a process, method, system, product or device that is described to include a series of steps or modules is not necessarily limited to include those steps or modules explicitly listed; instead, other steps or modules that are not explicitly listed or are intrinsic to the process, method, system, product or device can also be included. A division of modules and units described herein are merely a logical division, and various other divisions can be possible. For example, various modules can be combined or integrated into another system, or certain features can be omitted or not performed. Moreover, a coupling, a direct coupling or a communication connection as illustrated or discussed in the disclosure can be an indirect coupling or a communication connection via certain interfaces, and can be an electrical coupling, a mechanical coupling or a coupling in other forms, which is not limited herein. Modules or submodules illustrated as separate parts may or may not be physically separated, may or may not be physical modules, and can be distributed over a plurality of circuit modules. All or part of the modules can be selected to implement the embodiments of the disclosure according to actual requirements.

Embodiments of the disclosure provide an image encoding method and an encoder. The image encoding method and encoder can be used in image processing, and are capable of solving the problem of breathing effect that occurs in low-delay video transmission at a fixed bandwidth.

It will be appreciated that, an I-frame is an intra-frame encoded image that is able to spatially remove a redundancy between macro blocks in the same image frame. In other words, an I-frame is an image compressed according to a correlation between pixels in a picture, rather than a correlation of pixels between pictures. A P-frame is a forward-predictive encoded image that is able to temporally remove a redundancy between image frames. In other words, a P-image is an image compressed according to a correlation of pixels between pictures and a correlation between pixels in a picture. An encoding efficiency of a P-frame can be higher than that of an I-frame.

A macro block is a set of pixels constituting a two-dimensional rectangular region.

A quantization parameter (QP) is a parameter by which a mapping relation of a quantization in video decoding is determined. The quantization parameter can directly determine a bit rate of image compression.

An H264 encoder can be used for intra-frame prediction or inter-frame prediction on a YUV image to effect a spatial correlation compression and a temporal correlation compression. Optionally, other types of encoder having similar functionalities can be used. A type of encoder is not limited herein. A next image frame can be predicted based upon a current frame and a set of prediction coefficients since a similarity and a correlation exist between two consecutive frames or adjacent pixels of the same image. The H264 encoder can perform a predictive encoding on video signals and remove a redundancy between video signals (e.g., a correlation between video signals) using a compression algorithm. After a removal of a part of the redundancy, a dynamic range of the video signals can be reduced, thereby effecting a compression.

A low-delay video transmission is generally used in the art where a compression efficiency of I-frames can be lower than that of P-frames. Therefore, I-frames may consume a higher bit rate to achieve a compression effect of P-frames. In some embodiments of the disclosure, an I-frame is dispersed into a plurality of P-frames in form of slices, and then a refreshing region is refreshed for each of the P-frames. A first and a second encoding can be used to effect a consecutive refreshing of multiple image frames, thereby ensuring a stability of each one of the image frames.

Figure 1:
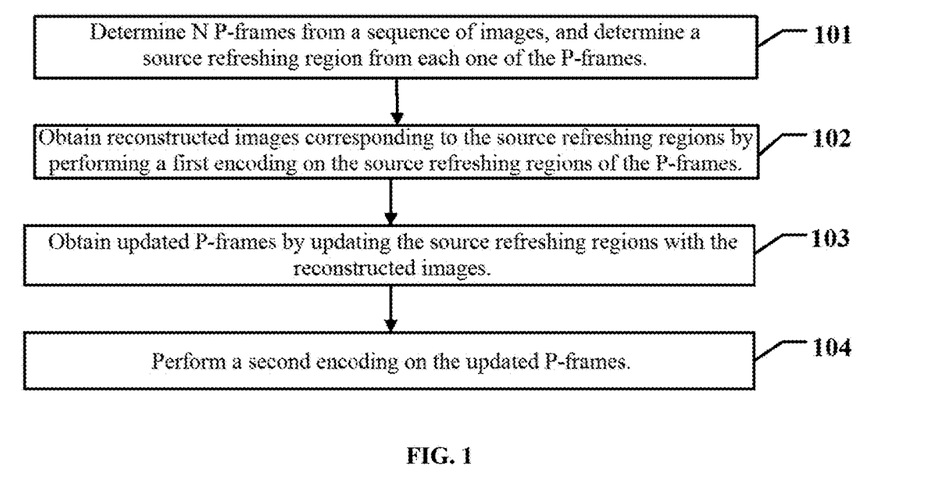
FIG. 1 shows a flowchart of an image encoding method in accordance with embodiments of the disclosure.

An image encoding method in accordance with embodiments of the disclosure will be described in detail with reference to FIG. 1. The method can comprise steps 101-104.

In step 101, N P-frames can be determined from a sequence of images, and a source refreshing region can be determined from each one of the P-frames. In some embodiments, a size of each one of the P-frames can be identical, and each one of the P-frames can comprise one source refreshing region.

In step 102, a first encoding can be performed on the source refreshing region of the P-frame to obtain reconstructed image corresponding to the source refreshing region. In some instances, N can be a positive integer. The image can be effectively compressed by the first encoding since a compression ratio of a P-frame is higher than that of an I-frame.

In step 103, the source refreshing region can be updated with the reconstructed images to obtain updated P-frames. By updating the source refreshing region with the reconstructed images, a compression ratio of a second encoding in step 104 can be improved, such that the bit rate can be more stable.

In some embodiments, the updating process can comprise: obtaining parameter values of pixels within respective macro block in the reconstructed image and the source refreshing region; and updating the parameter values of pixels in the source refreshing region with the parameter values of pixels in the reconstructed image by assigning values to the parameter values of pixels of the respective macro block in the source refreshing region.

In step 104, a second encoding can be performed on the updated P-frames. The second encoding can be performed on the P-frames to improve the compression efficiency to facilitate an transmission.

It will be appreciated that, in the embodiments of the disclosure, the first encoding and second encoding can be performed on each one of the P-frames into which the I-frame is dispersed (refer to steps 102 to 104). The refreshing of the entire frame can be completed only when all the N P-frames are refreshed.

In the embodiments of the disclosure, after the source refreshing regions of the P-frames are determined from the N P-frames in the image sequence, the reconstructed images can be obtained by performing the first encoding on the source refreshing regions. The updated P-frames can be obtained by updating the source refreshing regions with the reconstructed images. The second encoding can be performed on the updated P-frames. The compression efficiency and the bit rate stability can be effectively improved by performing the first and second encoding on each one of the P-frames, thereby solving the problem of breathing effect that occurs in low-delay video transmission at a fixed bandwidth.

Optionally, on basis of the embodiment described with reference to FIG. 1, in a first alternative embodiment of the disclosure, each of the updated P-frame can comprise a new refreshing region and a source region separate from the new refreshing region. The new refreshing region can correspond to the reconstructed image. In some instances, performing the second encoding on the updated P-frame can comprise: performing the second encoding on the new refreshing region according to the I-frame; and performing the second encoding on the source region according to the P-frame.

Optionally, on basis of the first alternative embodiment, in a second alternative embodiment of the disclosure, performing the second encoding on the source region according to the P-frame can comprise: if the source region comprises an unrefreshed region, then performing the second encoding on the unrefreshed region according to the P-frame (e.g., the P1 frame that is encoded first); if the source region comprises a refreshed region, then performing the second encoding on the refreshed region according to the P-frame (e.g., P2 frame, P3 frame, . . . , Pn frame); or if the source region comprises an unrefreshed region and a refreshed region, then performing the second encoding on the unrefreshed region and the refreshed region respectively according to the P-frame (e.g., the Pn frame that is encoded last).

Optionally, on basis of the embodiment described with reference to FIG. 1 and the first or the second alternative embodiment, in a third alternative embodiment of the disclosure, the N P-frames can be consecutive N P-frames, and the first encoding and the second encoding can be performed on each one of the P-frames in an order of P1, P2, . . . , PN (e.g., in an order from left to right).

Figure 4:
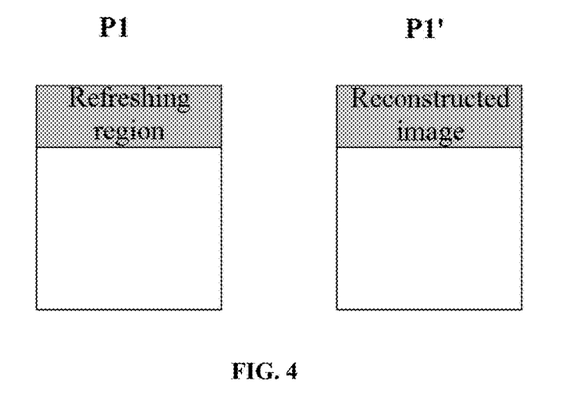
FIG. 4 shows generating a reconstructed image in accordance with embodiments of the disclosure.

In some instances, obtaining the reconstructed images corresponding to the source refreshing regions by performing the first encoding on the source refreshing regions of the P-frames can comprise: when the first encoding is performed on the source refreshing region of each one of the P-frames, obtaining a reconstructed image corresponding to the P-frame by referring to a new refreshing region on which the second encoding has been performed in a previous P-frame, as shown in FIG. 4.

Figure 5:
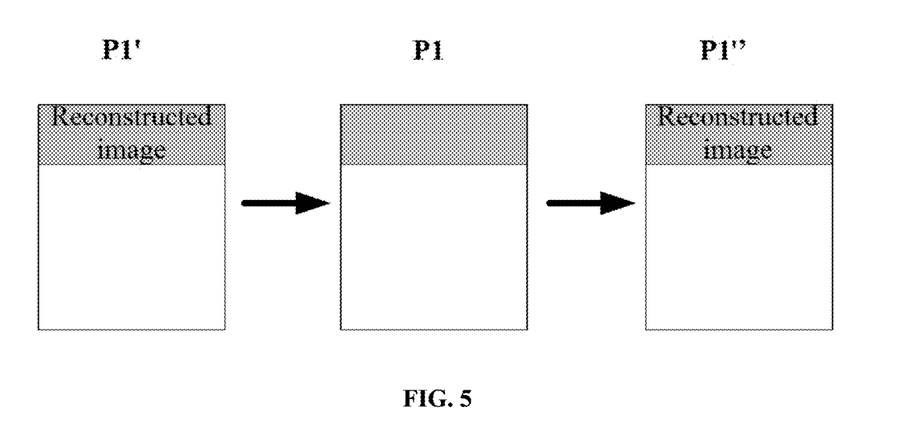
FIG. 5 shows updating a source refreshing region with a reconstructed image in accordance with embodiments of the disclosure.
Figure 6:
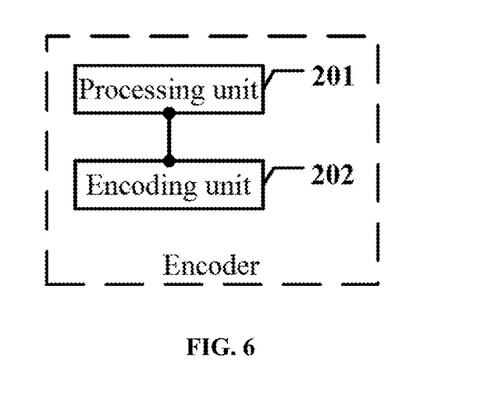
FIG. 6 shows a structure of an encoder in accordance with embodiments of the disclosure.

In some instances, obtaining the updated P-frames by updating the source refreshing regions with the reconstructed images can comprise: on basis of each one of a plurality of macro blocks included in the reconstructed image, assigning values to parameter values corresponding to each macro block in the source refreshing region by taking parameter values corresponding to the reconstructed image as reference, so as to update the source refreshing region with the reconstructed image and to obtain a new refreshing region, thereby forming an updated P-frame, as shown in FIG. 5 where P1″ is the updated P1 frame.

Optionally, on basis of the embodiment described with reference to FIG. 1 and the first to third alternative embodiments, in a fourth alternative embodiment of the disclosure, the method can further comprise: performing the first encoding and the second encoding successively on each one of the P-frames.

Optionally, on basis of the embodiment described with reference to FIG. 1 and the first to fourth alternative embodiments, in a fifth alternative embodiment of the disclosure, each one of the P-frames can comprise N regions. In some instances, except for the first encoded P-frame, an $(N-m)^{th}$ region of a $m^{th}$ P-frame can be identical to an $(N-m)^{th}$ region of a $(m-1)^{th}$ P-frame, and a new refreshing region of the $m^{th}$ region can be obtained by referring to new refreshing regions of a $1^{st}$ part to an $(N-2)^{th}$ part of the $(m-1)^{th}$ P-frame, where $2 \leq m \leq N$.

Figure 2:
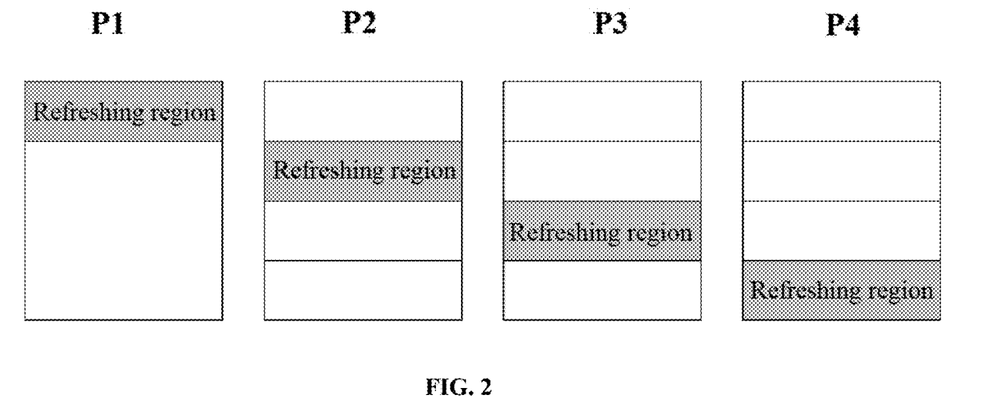
FIG. 2 shows refreshing an image from top to bottom in a row of macro blocks in accordance with embodiments of the disclosure.
Figure 3:
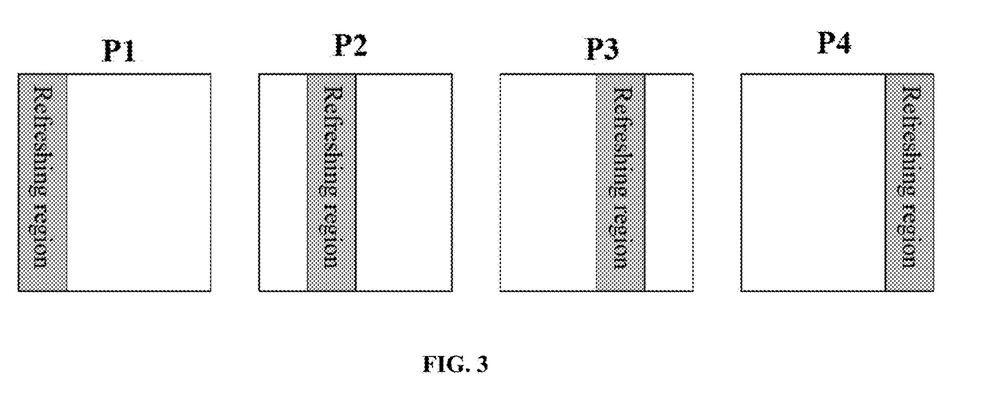
FIG. 3 shows refreshing an image from left to right in a column of macro blocks in accordance with embodiments of the disclosure.

As shown in FIG. 2, providing that a sequence of images comprises 4 P-frames (e.g., P1, P2, P3 and P4), when refreshing the frames in a row of macro blocks from top to bottom, a source refreshing region (e.g., the shaded region) in P1 can occupy ¼ of the total area of P1. The source refreshing regions in P2 to P4 can have similar configuration, as shown in FIG. 3.

Optionally, on basis of the third to fifth alternative embodiments, in a sixth alternative embodiment of the disclosure, each one of the P-frames can comprise a plurality of macro blocks. In some instances, performing the first encoding and the second encoding successively on each one of the P-frames can comprise: on basis of the macro blocks, successively refreshing the N P-frames in a row of macro blocks from top to bottom or in a column of macro blocks from left to right according to the encoding order until the refreshing of the I-frame is completed. Optionally, when each one of the P-frames is refreshed, a P-frame immediately preceding the P-frame and a P-frame immediately following the P-frame can overlap at a boundary thereof or do not overlap with each other.

Optionally, on basis of the embodiment described with reference to FIG. 1 and the first to sixth alternative embodiments, in a seventh alternative embodiment of the disclosure, performing the first encoding on the source refreshing regions of the P-frames according to the P-frame can comprise: performing the first encoding on each source refreshing region using a quantization parameter QP according to the P-frame, and recording the QP using a first quantization FirstQ. The QP can be adjusted according to a bit rate required in transmitting the P-frame. In some instances, the QP can be recorded using the FirstQ to utilize a current prediction mode as a reference for a next encoding on the macro blocks. A value of the QP can be in the range of 0 to 51. A value of the QP used in the second encoding can be smaller than that used in the first encoding. A specific value of the QP can be adjusted based upon a motion scene of frames, and is not limited in the disclosure.

Optionally, on basis of the embodiment described with reference to FIG. 1 and the first to seventh alternative embodiments, in an eighth alternative embodiment of the disclosure, dispersing the entire I-frame into the N P-frames can comprise: evenly splitting and dispersing the I-frame into the N P-frames in a form of slices, such that a plurality of source refreshing regions corresponding to the I-frame can be dispersed into the N P-frames, each of the P-frames comprising one of the source refreshing regions.

An image encoding method according to embodiments of the disclosure has been described in detail hereinabove. An encoding device according to embodiments of the disclosure will be described by way of example, based upon the above described method. The encoding device can be an encoder, for example an H264 encoder. A specific type of the encoder is not limited in the disclosure. Referring to FIG. 5, the encoder according to embodiments of the disclosure can comprise: a processing unit 201, i.e., a processing circuit or a processor, configured to determine N P-frames from a sequence of images, and determine a source refreshing region from each one of the P-frames; and an encoding unit 202, i.e., an encoding circuit, configured to obtain reconstructed images corresponding to the source refreshing regions by performing a first encoding on the source refreshing regions, where N can be a positive integer. The processing unit 201 can be further configured to obtain updated P-frames by updating the source refreshing regions with the reconstructed images. The encoding unit 202 can be further configured to perform a second encoding on the updated P-frames.

In the embodiments of the disclosure, after the processing unit 201 determining the source refreshing regions of the P-frame from the N P-frames in the image sequence, the encoding unit 202 can be configured to (1) obtain the reconstructed image by performing the first encoding on the source refreshing regions, (2) obtain the updated P-frames by updating the source refreshing regions with the reconstructed images, and (3) perform the second encoding on the updated P-frames. The compression efficiency and the bit rate stability can be effectively improved by performing the first and second encoding on each one of the P-frames, thereby solving the problem of breathing effect that occurs in low-delay video transmission at a fixed bandwidth.

Optionally, on basis of the embodiment described with reference to FIG. 2, in a first alternative embodiment of the disclosure, each of the updated P-frame can comprise a new refreshing region and a source region separate from the new refreshing region. The new refreshing region can correspond to the reconstructed image. The encoding unit 202 can be configured to perform the second encoding on the new refreshing regions according to an I-frame, and perform the second encoding on the source regions according to the P-frame. Optionally, in performing the first encoding, the first encoding can be performed on an image data in the source refreshing region based upon the P-frame.

Optionally, on basis of the first alternative embodiment, in a second alternative embodiment of the disclosure, the encoding unit 202 can be configured to: if the source region comprises an unrefreshed region, then perform the second encoding on the unrefreshed region according to the P-frame; if the source region comprises a refreshed region, then perform the second encoding on the refreshed region according to the P-frame; or if the source region comprises an unrefreshed region and a refreshed region, then perform the second encoding on the unrefreshed region and the refreshed region respectively according to the P-frame.

Optionally, on basis of the embodiment described with reference to FIG. 2 and the first or the second alternative embodiment, in a third alternative embodiment of the disclosure, the N P-frames can be consecutive N P-frames, and the first encoding and the second encoding can be performed on each one of the P-frames in an encoding order of P1, P2, . . . , PN (e.g., in an order from left to right).

In some instances, the processing unit 201 can be further configured to: on basis of each one of a plurality of macro blocks included in the reconstructed image, assigning values to parameter values corresponding to each macro block in the source refreshing region by taking parameter values corresponding to the reconstructed image as reference, so as to update the source refreshing region with the reconstructed image and to obtain a new refreshing region, thereby forming an updated P-frame.

In some instances, the encoding unit 202 can be further configured to: when the first encoding is performed on the source refreshing region of each one of the P-frames, obtain a reconstructed image corresponding to the P-frame by referring to a new refreshing region on which the second encoding has been performed in a previous P-frame.

Optionally, on basis of the embodiment described with reference to FIG. 2 and the first to third alternative embodiments, in a fourth alternative embodiment of the disclosure, the encoding unit 202 can be further configured to: perform the first encoding and the second encoding successively on each one of the P-frames.

Optionally, on basis of the embodiment described with reference to FIG. 2 and the first to fourth alternative embodiments, in a fifth alternative embodiment of the disclosure, each one of the P-frames can comprise N regions. In some instances, except for the first encoded P-frame, an $(N-m)^{th}$ region of a $m^{th}$ P-frame can be identical to an $(N-m)^{th}$ region of a $(m-1)^{th}$ P-frame, and a new refreshing region of the $m^{th}$ region can be obtained by referring to new refreshing regions of a $1^{st}$ part to an $(N-2)^{th}$ part of the $(m-1)^{th}$ P-frame, where $2 \leq m \leq N$.

Optionally, on basis of the third to the fifth alternative embodiments, in a sixth alternative embodiment of the disclosure, each one of the P-frames can comprise a plurality of macro blocks. The encoding unit 202 can be further configured to: on basis of the macro blocks, successively refresh the N P-frames in a row of macro blocks from top to bottom or in a column of macro blocks from left to right according to the encoding order until the refreshing of the I-frame is completed. In some instances, when each one of the P-frames is refreshed, a P-frame immediately preceding the P-frame and a P-frame immediately following the P-frame can overlap at a boundary thereof or do not overlap with each other.

Optionally, on basis of the embodiment described with reference to FIG. 2 and the first to sixth alternative embodiments, in a seventh alternative embodiment of the disclosure, the encoding unit 202 can be further configured to perform the first encoding on each source refreshing region using a quantization parameter QP according to the P-frame, and record the QP using a first quantization FirstQ. The QP can be adjusted according to a bit rate required in transmitting the P-frame.

Optionally, on basis of the embodiment described with reference to FIG. 2 and the first to seventh alternative embodiments, in an eighth alternative embodiment of the disclosure, the processing unit 201 can be configured to: evenly split and disperse the I-frame into the N P-frames in a form of slices, such that a plurality of source refreshing regions corresponding to the I-frame can be dispersed into the N P-frames, each of the P-frames comprising one of the source refreshing regions.

The description provided for each embodiment may emphasize a specific aspect of the embodiment. Any specific aspect of an embodiment, to which no detailed description is provided, can be found by referring to relevant description of other embodiments.

It is apparent to one skilled in the art that, a function and operation of systems, devices and units as discussed hereinabove can be clear by referring to corresponding processes as described in the illustrative methods.

It will be appreciated that, the system, device and method as disclosed in the embodiments of the disclosure can be implemented with other approaches. For example, the device embodiments as described hereinabove are merely illustrative. For example, a division of the units is merely a logical and functional division, and various divisions can be possible. For example, various units or components can be combined or integrated into another system, or certain features can be omitted or not performed. For example, a coupling, a direct coupling or a communication connection as illustrated or discussed in the disclosure can be an indirect coupling or a communication connection via certain interfaces, means or units, and can be an electrical coupling, a mechanical coupling or a coupling in other forms.

The units illustrated as separate parts may or may not be physically separated. The parts shown as units may or may not be physical units. For example, the parts can be provided at the same location or distributed over a plurality of network units. All or part of the units can be selected to implement the embodiments of the disclosure according to actual requirements.

Various functional units described in the embodiments of the disclosure may be integrated into a processing unit or may be provided as physically separate units. Two or more units can be integrated into one single unit. The integrated units can be implemented either in hardware or in software.

The integrated units can be stored in a computer readable storage medium when implemented in form of software functional units and sold or used as a standalone product. All or part of the technical solution of the disclosure substantially contributing to the prior art can be embodied in form of software product stored in a storage medium comprising a number of instructions for directing a computer (for example, a PC, a server, or other network devices) to perform all or part of the steps of the method in accordance with embodiments of the disclosure. The storage medium can comprise a flask disk, a removable hard drive, a read only memory (ROM), a random access memory (RAM), a magnet disk, an optical disk, or other media capable of storing program code.

An image encoding method and an encoder are provided in detail. The principle and implementation of the disclosure are illustrated herein by way of examples merely for the purpose of facilitating an understanding of the method of the disclosure and the key concept thereof. For an ordinary skilled in the art, variations can be made to the specific implementation and application of the present disclosure in accordance with the spirit of the disclosure. The disclosure is not provided to limit the scope of the disclosure.

What is claimed is:

1. An image encoding method comprising:
   determining N P-frames from a sequence of images, N being a positive integer;
   for each P-frame, determining a source refreshing region in the P-frames, the source refreshing region being a portion less than a whole region of the P-frame;
   obtaining reconstructed images corresponding to the source refreshing regions by performing a first encoding on the source refreshing regions, including:
      performing the first encoding on each of the source refreshing regions using a quantization parameter according to the P-frames; and
      recording the quantization parameter using a first quantization, the quantization parameter being obtained by adjusting a bit rate required in transmitting the P-frames;
   obtaining updated P-frames by updating the source refreshing regions with the reconstructed images; and
   performing a second encoding on the updated P-frames.

2. The method of claim 1, wherein:
   each of the updated P-frames includes a new refreshing region and a source region separated from the new refreshing region, the new refreshing region corresponding to the reconstructed image corresponding to the updated P-frame; and
   performing the second encoding on the updated P-frames includes:
   performing the second encoding on the new refreshing regions according to an I-frame encoding mode;
   performing the second encoding on the source regions according to a P-frame encoding mode.

3. The method of claim 2, wherein performing the second encoding on the source regions according to the P-frame encoding mode includes:
   if the source regions includes an unrefreshed region, performing the second encoding on the unrefreshed region according to the P-frame encoding mode;
   if the source region includes a refreshed region, performing the second encoding on the refreshed region according to the P-frame encoding mode; or
   if the source region includes an unrefreshed region and a refreshed region, performing the second encoding on the unrefreshed region and the refreshed region, respectively, according to the P-frame encoding mode.

4. The method of claim 1, wherein:
   the N P-frames are consecutive N P-frames including P1, P2, . . . , PN, and the first encoding and the second encoding are performed on the P-frames in an order of P1, P2, . . . , PN from left to right;
   obtaining the reconstructed images corresponding to the source refreshing regions by performing the first encoding on the source refreshing regions of the P-frames includes:
   for each one of the P-frames, performing the first encoding on the corresponding source refreshing region to obtain the corresponding reconstructed image by referring to the new refreshing region of a previous P-frame on which the second encoding has been performed; and
   obtaining the updated P-frames by updating the source refreshing regions with the reconstructed images includes:
      on basis of each one of a plurality of macro blocks included in the reconstructed images, assigning values to parameter values corresponding to each macro block in the source refreshing regions by taking parameter values corresponding to the reconstructed image as reference, so as to update the source refreshing regions with the reconstructed images and to obtain the new refreshing regions, thereby forming the updated P-frames.

5. The method of claim 1, further comprising:
   performing the first encoding and the second encoding successively on the P-frames.

6. The method of claim 5, wherein:
   each one of the P-frames includes a plurality of macro blocks, and
   performing the first encoding and the second encoding successively on the P-frames includes:
      on basis of the macro blocks, successively refreshing the N P-frames in order for rows of macro blocks from top to bottom or for columns of macro blocks from left to right until refreshing of an I-frame of the sequence of images corresponding to the P-frames is completed, wherein when one of the P-frames is refreshed, a P-frame immediately preceding the one of the P-frames and a P-frame immediately following the one of the P-frames overlap at boundaries thereof or do not overlap with each other.

7. The method of claim 1, wherein:
   each one of the P-frames includes N regions,
   an $(N-m)^{th}$ region of an $m^{th}$ P-frame is identical to an $(N-m)^{th}$ region of an $(m-1)^{th}$ P-frame, $2 \leq m \leq N$, and
   the new refreshing region of the $m^{th}$ region is obtained by referring to new refreshing regions of a $1^{st}$ part to an $(N-2)^{th}$ part of the $(m-1)^{th}$ P-frame.

8. An encoder comprising:
   a processing circuit configured to determine N P-frames from a sequence of images, N being a positive integer, and for each P-frame, determine a source refreshing region in the P-frame, the source refreshing region being a portion less than a whole region of the P-frame; and an encoding circuit configured to obtain reconstructed images corresponding to the source refreshing regions by performing a first encoding on the source refreshing regions;

wherein:

the processing circuit is further configured to obtain updated P-frames by updating the source refreshing regions with the reconstructed images; and the encoding circuit is further configured to:
perform the first encoding on each of the source refreshing regions using a quantization parameter according to the P-frames,
record the quantization parameter using a first quantization, the quantization parameter being obtained by adjusting a bit rate required for transmitting the P-frames, and
perform a second encoding on the updated P-frames.

9. The encoder of claim 8, wherein:
each of the updated P-frames includes a new refreshing region and a source region separated from the new refreshing region, the new refreshing region corresponding to the reconstructed image corresponding to the updated P-frame; and
the encoding circuit is further configured to:
perform the second encoding on the new refreshing regions according to an I-frame encoding mode; and
perform the second encoding on the source regions according to a P-frame encoding mode.

10. The encoder of claim 9, wherein the encoding circuit is further configured to:
if the source region includes an unrefreshed region, perform the second encoding on the unrefreshed region according to the P-frame encoding mode;
if the source region includes a refreshed region, perform the second encoding on the refreshed region according to the P-frame encoding mode; or
if the source region includes an unrefreshed region and a refreshed region, perform the second encoding on the unrefreshed region and the refreshed region, respectively, according to the P-frame encoding mode.

11. The encoder of claim 8, wherein:
the N P-frames are consecutive N P-frames including P1, P2, . . . , PN, and the first encoding and the second encoding are performed on the P-frames in an encoding order of P1, P2, . . . , PN from left to right;
the encoding circuit is further configured to:
for each one of the P-frames, perform the first encoding on the corresponding source refreshing region to obtain the corresponding reconstructed image by referring to the new refreshing region of a previous P-frame on which the second encoding has been performed; and the processing circuit is further configured to:
on basis of each one of a plurality of macro blocks included in the reconstructed images, assigning values to parameter values corresponding to each macro block in the source refreshing regions by taking parameter values corresponding to the reconstructed image as reference, so as to update the source refreshing regions with the reconstructed images and to obtain the new refreshing regions, thereby forming the updated P-frames.

12. The encoder of claim 8, wherein the encoding circuit is further configured to perform the first encoding and the second encoding successively on the P-frames.

13. The encoder of claim 12, wherein:
each one of the P-frames includes a plurality of macro blocks, and
the encoding circuit is further configured to:
on basis of the macro blocks, successively refresh the N P-frames in order for rows of macro blocks from top to bottom or for columns of macro blocks from left to right until refreshing of an I-frame of the sequence of images corresponding to the P-frames is completed, wherein when one of the P-frames is refreshed, a P-frame immediately preceding the one of the P-frames and a P-frame immediately following the one of the P-frames overlap at boundaries thereof or do not overlap with each other.

14. The encoder of claim 8, wherein:
each one of the P-frames includes N regions,
an $(N-m)^{th}$ region of an $m^{th}$ P-frame is identical to an $(N-m)^{th}$ region of an $(m-1)^{th}$ P-frame, $2 \leq m \leq N$, and
the new refreshing region of the $m^{th}$ region is obtained by referring to new refreshing regions of a $1^{st}$ part to an $(N-2)^{th}$ part of the $(m-1)^{th}$ P-frame.

15. An image encoding method comprising:
determining N P-frames from a sequence of images, N being a positive integer;
for each P-frame, determining a source refreshing region in the P-frames, the source refreshing region being a portion less than a whole region of the P-frame;
obtaining reconstructed images corresponding to the source refreshing regions by performing a first encoding on the source refreshing regions;
obtaining updated P-frames by updating the source refreshing regions with the reconstructed images; and
performing a second encoding on the updated P-frames, wherein:
each one of the P-frames includes N regions,
an $(N-m)^{th}$ region of an $m^{th}$ P-frame is identical to an $(N-m)^{th}$ region of an $(m-1)^{th}$ P-frame, $2 \leq m \leq N$, and
the new refreshing region of the $m^{th}$ region is obtained by referring to new refreshing regions of a $1^{st}$ part to an $(N-2)^{th}$ part of the $(m-1)^{th}$ P-frame.

* * * * *